United States Patent Office 2,744,851
Patented May 8, 1956

2,744,851

CARDIAC GLYCOSIDES FOR INTRAMUSCULAR INJECTION

Alfred Halpern and Clifford H. Bradney, New York, N. Y., assignors to E. Fougera & Co., Inc., New York, N. Y., a corporation of New York No Drawing. Application April 28, 1951,
Serial No. 223,652

9 Claims. (Cl. 167—58)

This invention relates to solutions of water-insoluble cardiac glycosides in inert solvents, and it has particular relation to solutions of this type, which are stable on storage and can be administered by intravenous or intramuscular injection to human beings and animals.

Certain glycosides, particularly digitoxin, are used to stimulate the cardiac activity in human beings and animals. This use is limited by the lack of a reliable, stable preparation which can be injected intramuscularly to produce the desired stimulating effect. At the present time, the only parenteral route is intravenous. The solution used for this route containe about 40% of alcohol, and it cannot be injected intramuscularly because this alcohol concentration would cause serious tissue damage.

One of the prime factors necessitating the presence of alcohol, is the tendency of the cardiac glycosides to hydrolyse. This hydrolysis, which takes place rather easily in the presence of water, is well known and it is also known that the resulting degradation products have different physiological activity and cannot be used for therapeutic purposes.

The main object of the present invention is to provide a solution containing the above mentioned water-insoluble cardiac glycosides, which is stable and capable of being injected intramuscularly in man and animals.

It is also an object of this invention to provide a method for preparing glycoside solutions showing the above mentioned characteristics.

Other objects and the advantages of the invention will be apparent from the appended claims and the following specification, which describes, by way of example, some embodiments of the invention.

Example 1

0.2 milligram of digitoxin are dissolved in 0.2 cc. of benzyl alcohol and sufficient polyoxyethylene glycol, having an average molecular weight of 300, are added to make 1 cc. of solution.

The solution is filtered, sterilized and can be injected intramuscularly in the usual manner.

Example 2

10 milligrams of digitoxin are dissolved in sufficient polyoxyethylene glycol, having an average molecular weight of 300, to make 50 cc. of solution.

The solution is filtered and sterilized, is filled into 1 cc. ampoules and can be used for intramuscular injections.

Example 3

60 milligrams of digitoxin are dissolved in 2 cc. of benzyl alcohol and 98 cc. of polyoxyethylene glycol having an average molecular weight of 300. This solution can be diluted with 200 cc. or less of distilled water. The diluted solution is filtered, sterilized and ampouled and can be used for intramuscular injections.

Example 4

40 milligrams of digitoxin are dissolved in 2 cc. of benzyl alcohol, to which is added 98 cc. of polyoxyethylene glycol having an average molecular weight of 300. This solution is diluted with 100 cc. of distilled water and then filtered, sterilized and ampouled. It is suitable for intramuscular injections.

Example 5

30 milligrams of digitoxin are dissolved in sufficient polyoxyethylene glycol, having an average molecular weight of 300, to make 50 cc. of solution. To this solution 50 cc. of glycerine and 50 cc. of water are added. The resulting solution is filtered, sterilized and ampouled and is then ready for intramuscular injections.

The digitoxin may be first dissolved in the necessary amount of benzyl alcohol, to which the other beforementioned solvents are subsequently added.

Example 6

In the above Examples 1–5, polyoxyethylene glycol having an average molecular weight of either 200 or 400 or 600, or mixtures of such polyoxyethylene glycols are in part or wholly substituted for equal weights of polyoxyethylene glycol with an average molecular weight of 300, used in said examples.

Example 7

In Examples 1–6, therapeutically equivalent amounts of other cardiac glycosides, such a gitoxin, gitalin, lanatosid A, B and C, oleandrin, thevetin, scillaren, digoxin, strophantin, bufotoxin, which may be derived from plants or animals, can be partly or wholly substituted for the digitoxin used in said examples.

Example 8

In Example 3, 1 cc. of chlorobutanol is substituted for the benzyl alcohol used in Example 3.

To the solutions obtained in Examples 1, 2, 6, 7 and 8, distilled water can be added up to 65% by weight.

Example 9

0.2 milligram of digitoxin are uniformly mixed with 0.5 gram of solid polyoxyethylene glycol having an average molecular weight of about 1000 and heated to about 60° C. To this solution is added 0.3 gram of glycerine and 0.2 gram of water heated to 60° C. The material is allowed to cool to ordinary room temperature. This solution can be injected intramuscularly.

Example 10

2 milligrams of digitoxin is dissolved at a temperature of about 60° C. in polyoxyethylene glycol having average molecular weight of about 1000 and to this solution 6 cc. of water are added. After cooling to ordinary room temperature, the resultant solution can be used for intramuscular injection.

Example 11

In Example 10, equal amounts of a solid polyoxyethylene glycol having average molecular weight of about 1500, 2000 and 4000, can be substituted for polyoxyethylene glycol having average molecular weight of about 1000. Furthermore, the solid polyoxyethylene glycols can be used in mixture with liquid polyoxyethylene glycols in carrying out the present invention.

In carrying out the present invention, the solid polyoxyethylene glycols can be used in substantially the same manner as liquid polyoxyethylene glycols and all of them formulated to contain some benzyl alcohol, preferably 2–4% based on the weight of the total composition. The benzyl alcohol acts as a local anesthetic to prevent or reduce pain on injection.

The preferred polyoxyethylene glycols used in carrying out this invention, are inert substances which are liquid at ordinary room temperature and have average molecular weight of from 200 to 600, particularly 200, 300, 400 or 600. As shown by the above Examples 9-11, polyoxyethylene glycols, which are solid at ordinary room temperature and have average molecular weights of 1000 and more, can also be used. But the use of the liquid products is easier and simpler and the use of solid polyoxyethylene glycols has no advantage over that of the liquid polymers.

The polyoxyethylene glycols correspond to the general chemical formula

$$HOCH_2CH_2(OCH_2CH_2)_nOH$$

They are stable products having no toxic or other harmful effects. It has been found that substantially no hydrolysis of the glycosides dissolved according to the present invention, takes place, even in the presence of water, in contrast to solutions of said glycosides, prepared by means of other solvents.

It will be understood that this invention is not limited to the specific details described above and can be carried out with various modifications. For example, glycoside solutions of other concentrations than those described in the above examples, can be prepared and the solvents used may contain the above mentioned individual ingredients in proportions different from those specifically described above. These and other modifications can be made without departing from the scope of the invention, as defined in the appended claims.

What is claimed is:

1. A liquid preparation adapted to be used for intramuscular injection, containing a cardiac glycoside, water and polyoxyethylene glycol having average molecular weight in the range of 200 to 600.

2. A liquid preparation adapted to be used for intramuscular injection, containing digitoxin, water and polyoxyethylene glycol having average molecular weight in the range of 200 to 600, as stabilizer and solvent.

3. A liquid preparation adapted to be used for intramuscular injection, containing digitoxin, water and polyoxyethylene glycol having average molecular weight in the range of 300 to 400, as stabilizer and solvent.

4. A liquid preparation adapted to be used for intramuscular injection, containing digitoxin, water and polyoxyethylene glycol having average molecular weight in the range of 300, as stabilizer and solvent.

5. A liquid preparation adapted to be used for intramuscular injection, containing digitoxin, water and polyoxyethylene glycol having average molecular weight of 300, and benzyl alcohol.

6. A liquid preparation adapted to be used for intramuscular injection, containing digitoxin, water and polyoxyethylene glycol having average molecular weight of 300, and glycerine.

7. A liquid preparation adapted to be used for intramuscular injection, containing digitoxin, water and polyoxyethylene glycol having average molecular weight of 300, benzyl alcohol, and glycerine.

8. A liquid preparation adapted to be used for intramuscular injection, containing digitoxin, water, polyoxyethylene glycol having average molecular weight of 300 and chlorobutanol.

9. A liquid preparation adapted to be used for intramuscular injection, containing digoxin, water and polyoxyethylene glycol having average molecular weight in the range of 200 to 600, as stabilizer and solvent.

References Cited in the file of this patent

UNITED STATES PATENTS

| | | |
|---|---|---|
| 2,033,921 | Christiansen | Mar. 17, 1936 |
| 2,411,631 | Miescher | Nov. 26, 1946 |
| 2,431,558 | Huber | Nov. 25, 1947 |
| 2,457,188 | Stone | Dec. 28, 1948 |
| 2,600,344 | Van Meter | June 10, 1952 |

OTHER REFERENCES

Friesen: Pharmazie, July 1946, vol. 1. pp. 76–79.

Cheymol: Ann. Pharmaceutiques, Francaises, Jan. 1947, pp. 59–60.

Nimrodette: Perfumery & Essential Record, June 1948, pp. 179–183.

Friedman: Jour. of Lab. & Clinical Med., May 1944, pp. 530 and 531.

Carbide & Carbon Chemical Co., "Carbowax Compounds and Polyethylene Glycols," June 1946, pp. 4, 5, 7 and 9.

U. S. Dispensatory, 24th ed., Philadelphia 1947, pp. 148, 149 and 377. (Copy in Division 43.)